United States Patent
Sugiyama

(10) Patent No.: US 8,100,113 B2
(45) Date of Patent: Jan. 24, 2012

(54) FUEL PUMP LAYOUT STRUCTURE IN MOTORCYCLE

(75) Inventor: Eiji Sugiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 12/039,093

(22) Filed: Feb. 28, 2008

(65) Prior Publication Data

US 2008/0210203 A1    Sep. 4, 2008

(30) Foreign Application Priority Data

Mar. 2, 2007    (JP) ................................. 2007-052830

(51) Int. Cl.
    *F02M 37/04*    (2006.01)
    *B62K 19/30*    (2006.01)
    *B62K 19/40*    (2006.01)

(52) U.S. Cl. ...................................................... 123/509
(58) Field of Classification Search .................... 123/509
See application file for complete search history.

(56) References Cited

U.S. PATENT DOCUMENTS

| | | | |
|---|---|---|---|
| 4,673,053 A * | 6/1987 | Tanaka et al. ................. | 180/227 |
| 6,932,177 B2 * | 8/2005 | Hara et al. ..................... | 123/509 |
| 2004/0200652 A1 * | 10/2004 | Hara et al. ..................... | 180/219 |
| 2005/0274363 A1 * | 12/2005 | Amino ............................ | 123/514 |
| 2007/0125585 A1 * | 6/2007 | Takahashi et al. ............ | 180/219 |
| 2008/0000707 A1 * | 1/2008 | Gruber et al. ................. | 123/497 |
| 2008/0210203 A1 * | 9/2008 | Sugiyama ...................... | 123/509 |

FOREIGN PATENT DOCUMENTS

| | | | |
|---|---|---|---|
| JP | 2005-096504 | | 4/2005 |
| JP | 2005162209 A | | 6/2005 |
| JP | 2006182154 A | * | 7/2006 |

\* cited by examiner

*Primary Examiner* — Stephen K Cronin
*Assistant Examiner* — Arnold Castro
(74) *Attorney, Agent, or Firm* — Westerman, Hattori, Daniels & Adrian, LLP

(57) ABSTRACT

A fuel pump layout structure in a motorcycle, including an engine, a fuel pump for the supplying fuel to the engine, a frame for supporting the engine and the fuel pump, and a rear suspension damper disposed behind the frame with a swing arm being swingably suspended from the rear suspension damper, wherein said fuel pump is disposed on one side of said rear suspension damper.

11 Claims, 8 Drawing Sheets

FUEL PUMP LAYOUT STRUCTURE IN MOTORCYCLE

BACKGROUND OF THE INVENTION

The present invention relates to a fuel pump layout structure in a motorcycle for disposing a fuel pump behind an engine.

There is known a motorcycle which positions a fuel pump outside a fuel tank. In a certain motorcycle of such a type, a fuel pump is disposed within a main frame (body frame) which supports an engine and behind the engine (see, for example, Japanese Patent Laid-Open No. 2005-096504).

However, in the case where an auxiliary device (e.g., a starting motor) of the engine is disposed on an engine crank case, it is difficult to ensure space for a fuel pump within a main frame.

According to another layout, a fuel pump is disposed sideways of the portion between an engine and a center frame which constitutes a rear portion of a main frame. However, from the standpoint of rider's operation, it is not good for the fuel pump to project sideways.

SUMMARY OF THE INVENTION

The present invention has been accomplished in view of the above-mentioned circumstances and it is an object of the present invention to provide a fuel pump layout structure in a motorcycle not affected by the layout of an auxiliary device of the engine.

According to the present invention there is provided a fuel pump layout structure in a motorcycle including: an engine; a fuel pump for the supply of fuel to the engine; a frame for supporting the engine and the fuel pump; and a rear suspension damper disposed behind the frame with a swing arm being suspended from the rear suspension damper swingably; characterized in that the fuel pump is disposed on one side of the rear suspension damper.

According to this construction, the layout of the fuel pump does not exert any influence on the layout of an auxiliary device of the engine, nor does the fuel pump project sideways of the vehicle body.

An intake part and an exhaust part both connected to the engine may be disposed on the other side of the rear suspension damper.

According to this construction, the fuel pump and intake and exhaust parts can be arranged in an optimum layout near the frame.

Further, the fuel pump may be attached to the frame through a bracket and a rubber member may be interposed between the bracket and the fuel pump and also between the bracket and the frame.

According to this construction, vibration on the vehicle body side can be absorbed by the rubber member.

According to the present invention, in a fuel pump layout structure in a motorcycle including: an engine; a fuel pump for the supply of fuel to the engine; a frame for supporting the engine and the fuel pump; and a rear suspension damper disposed behind the frame with a swing arm being suspended from the rear suspension damper swingably. Since the fuel pump is disposed on one side of the rear suspension damper, the layout of the fuel pump is not influenced by the layout of an auxiliary device of the engine.

Besides, the fuel pump can be located without projecting it sideways of the vehicle body.

Moreover, the fuel pump can be disposed (or located) at a position spaced away from the engine but not too long in distance from the engine as compared with the conventional mounting position of the fuel pump. As a result, it is possible to make the fuel pump difficult to undergo the influence of heat from the engine in comparison with the prior art.

Further, since intake and exhaust parts connected to the engine are disposed on the other side of the rear suspension damper, the fuel pump and the intake and exhaust parts can be disposed in an optimum layout near the frame. As a result, it is possible to prevent a fuel supply line from becoming too long while positioning the fuel pump behind the engine by effectively utilizing the space around the frame.

Additionally, since the fuel pump is attached to the frame through a bracket and a rubber member is interposed between the bracket and the fuel pump and also between the bracket and the frame, vibration on the vehicle body side can be absorbed by the rubber member. As a result, vibration is no longer propagated to the fuel pump and it is possible to improve the reliability of the fuel pump operation.

DETAILED DESCRIPTION OF THE INVENTION

Figure 1:
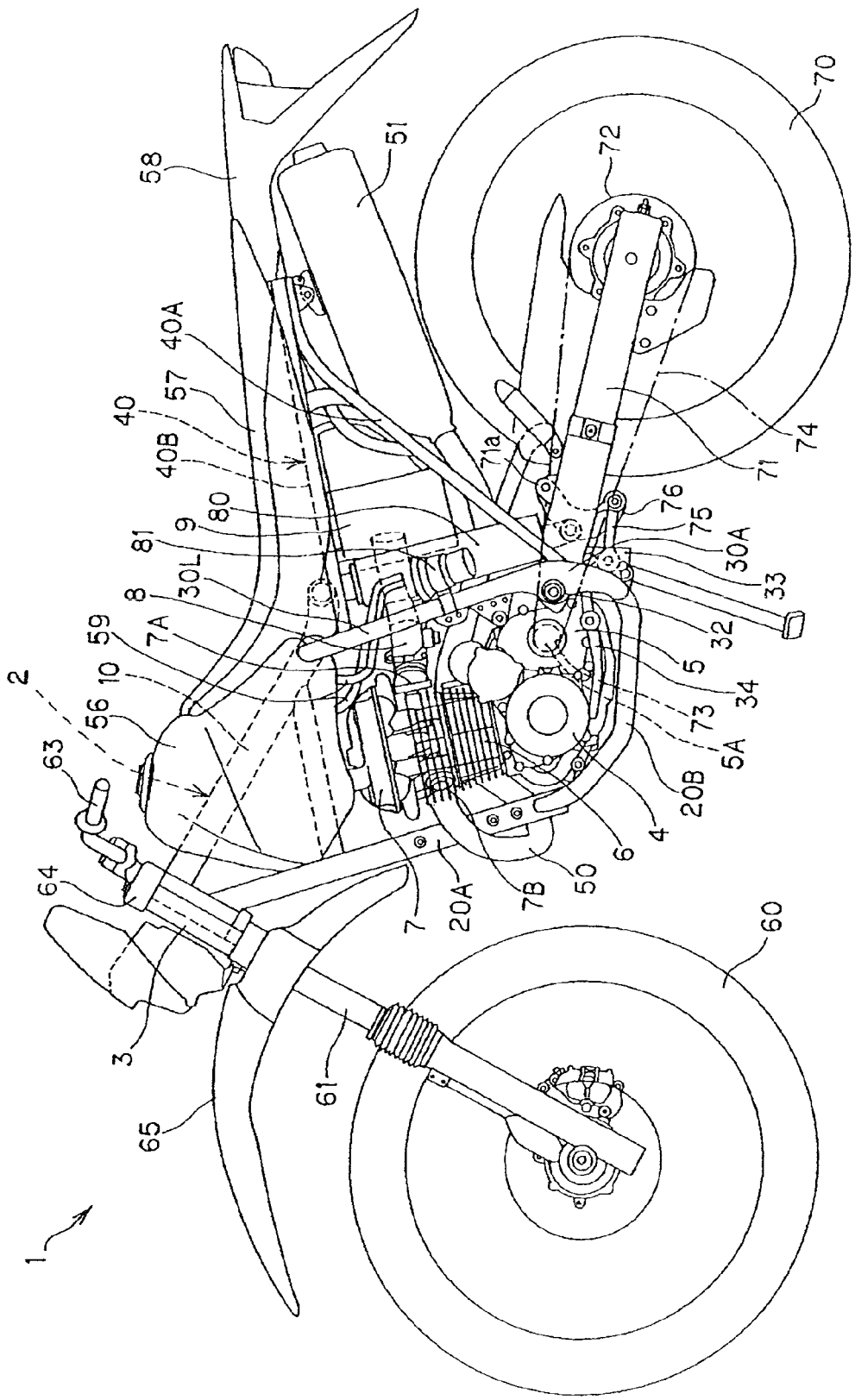
FIG. 1 is a left side view of a motorcycle related to an embodiment of the present invention.

A fuel pump layout structure in a motorcycle embodying the present invention will be described with reference to the drawings. FIG. 1 is a left side view showing an off-road motorcycle 1 related to this embodiment. Directions which will be referred to in the following description are based on FIG. 1. It is assumed that a vertical direction of the vehicle body is the vertical direction in FIG. 1, a transverse direction of the vehicle body is the depth direction of the paper in FIG. 1, and a longitudinal direction of the vehicle body is the transverse direction of the paper in FIG. 1. In FIG. 1, for ease of explanation, a side cover and a shroud, which cover an outside portion of the vehicle body, are omitted.

As shown in FIG. 1, a body frame 2 of the motorcycle 1 includes a main frame 10 extending backward and obliquely downward of the vehicle body from a head pipe 3, a down tube 20A extending below the main frame 10 downwards of the vehicle body from the head pipe, a pair of right and left lower pipes 20B, 20B contiguous to the down tube 20A on the lower side of the tube and extending backward below the vehicle body, and a pair of right and left center frames 30R, 30L which connect between a rear end of the main frame 10 and rear ends of the lower pipes 20B, 20B. The body frame 2 constitutes a cradle type frame and inside the area surrounded with the body frame 2 there is suspended an engine 4 through an engine hanger.

A pair of rear frames 40 extending backward of the vehicle body are secured to the center frames 30R and 30L, respectively. The rear frames 40 are made up of a pair of right and left pipes 40A, 40A extending backward and obliquely upward of the vehicle body from lower portions of the center frames 30L and 30R and a pair of right and left pipes 40B, 40B extending backward of the vehicle body from upper portions of the center frames 30L and 30R. Rear ends of the pipes 40A and 40B are connected with each other.

A seat 57, a rear fender 58 and side covers (not shown) are attached to the pipes 40A and 40B.

A pair of right and left front forks 61 which support a front wheel 60 through an axle are connected to the lower side of the head pipe 3, while a top bridge 64 with a steering handle 63 fixed thereto is connected to the upper side of the head pipe 3. Further, a front fender 65 is secured to the lower side of the head pipe 3 so as to cover the front wheel 60 from above.

The center frames 30 each have a bent portion 30A on the lower side thereof and a pivot shaft 32 is provided in the bent portion 30A so as to extend through the bent portion in the transverse direction of the vehicle body. A front end of a swing arm 71 which supports a rear wheel 70 through an axle is supported by the pivot shaft 32 so as to be vertically swingable. A drive chain 74 is entrained on a sprocket 72 mounted in the rear wheel 70 and also on a sprocket 73 mounted on an output shaft 5A of the engine 4. Driving force of the engine 4 is transmitted to the rear wheel 70 through the drive chain 74.

Figure 3:
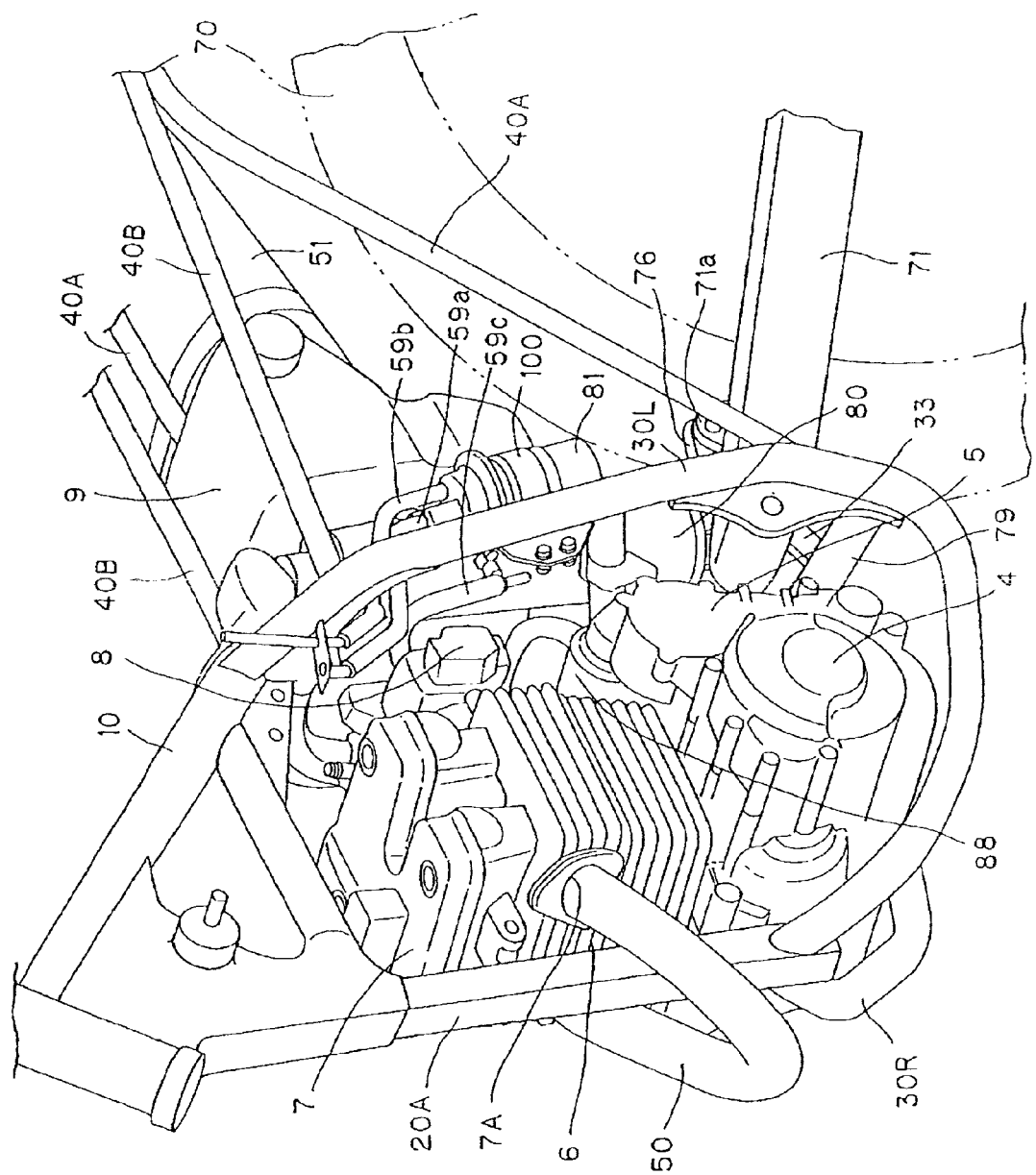
FIG. 3 is a right, front perspective view of FIG. 2.
Figure 4:
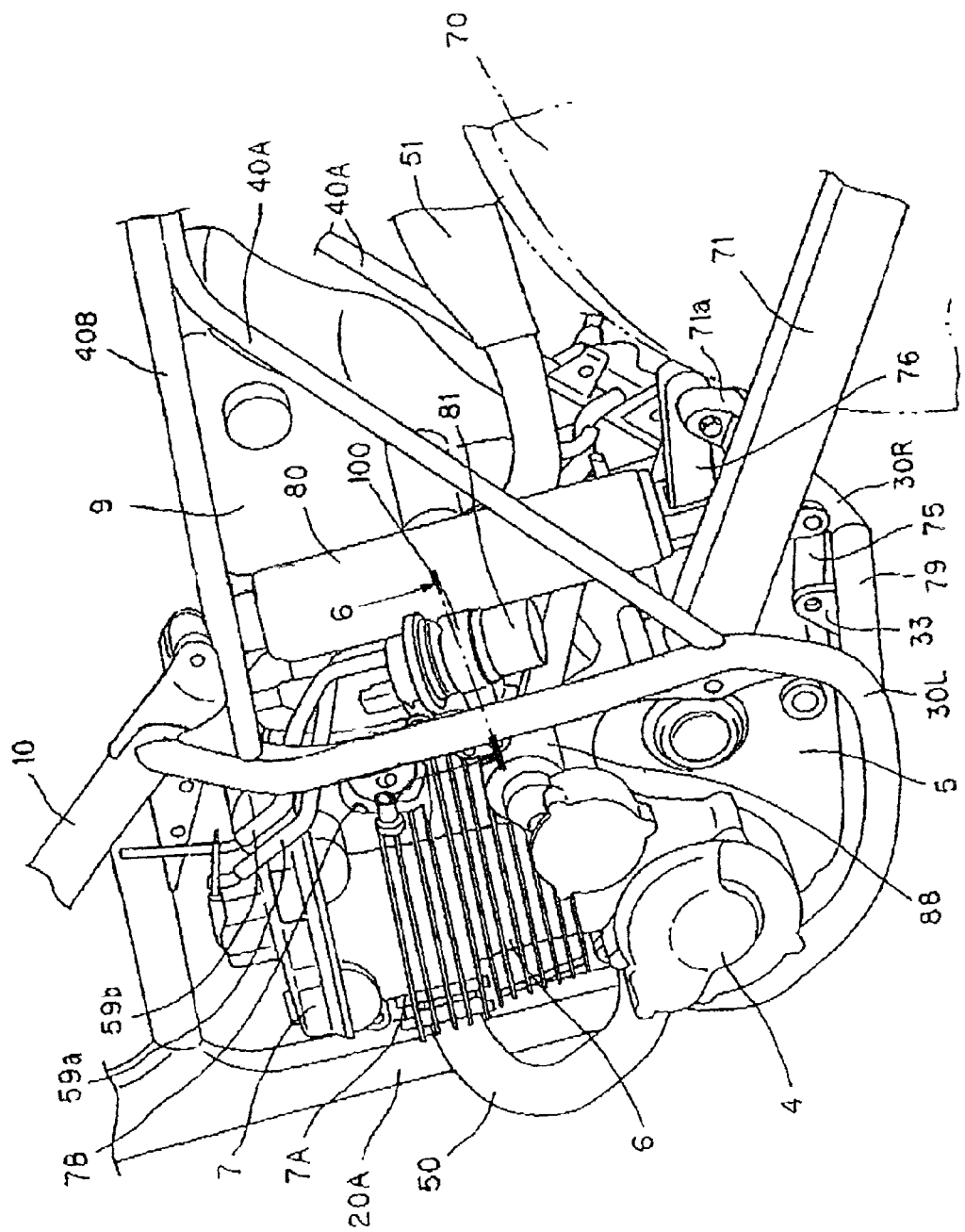
FIG. 4 is a right, rear perspective view of FIG. 2.

Below the bent portion 30A is positioned a cross member 79 (see FIGS. 3 and 4) which connects the center frames 30L and 30R with each other transversely, and a frame-side bracket 33 is secured to the cross member 79 centrally in the transverse direction. On the other hand, in an upper portion of the swing arm 71, a support portion 71a is formed (see FIGS. 3 and 4) and a link 76 having a downwardly bent shape is attached to the support portion 71a. More specifically, as shown in FIGS. 1, 3 and 4, one end of the link 76 is secured to the support portion 71a, a downwardly bent base end thereof is secured to a lower side of a rear suspension damper 80, and a bent lower end thereof is secured to the frame-side bracket 33 through a rod 75. That is, the rod 75 inhibits the link 76 from rotating in the rotational direction based on a connection fulcrum between the link and the support portion 71 a of the swing arm 71.

A gear change pedal 34 for the rider to put his or her foot thereon is provided in front of the bent portion 30A and in the vicinity of a lower side portion of the engine 4 (sideways of the space between the engine 4 and the center frame 30). During travel of the vehicle, the rider's foot is always placed near the pedal 34.

The engine 4 has a crank case 5, a cylinder block 6 extending substantially upward from a front portion of the crank case 5, and a cylinder head 7 connected to an upper portion of the cylinder block 6. The engine 4 is a single-cylinder engine having one cylinder within the cylinder block 6. In the cylinder block 6, a piston is received within a cylinder in a reciprocatable manner. A crank shaft connected to the piston through a connecting rod and the output shaft 5A of the engine are supported by the crank case 5. A clutch mechanism and a transmission mechanism, which constitute a power transfer mechanism between the crank shaft and the output shaft 5A, are received within the crank case 5. A starting motor 88 (an auxiliary device of the engine) shown in FIGS. 3 and 4 is disposed behind the engine 4 and in front of the center frames 30R and 30L. The crank shaft can be rotated by the starting motor 88.

Intake/exhaust valves for opening and closing an intake/exhaust passage communicating with the cylinder in the cylinder block 6 are accommodated within the cylinder head 7 and an intake port 7A of the intake/exhaust passage is formed in a rear face of the cylinder head 7. A throttle body 8 is connected to the intake port 7A and an air cleaner box 9 is connected to the throttle body 8.

In a front face of the cylinder head 7 is formed an exhaust port 7B of the intake/exhaust passage, and an exhaust pipe 50 is connected to the exhaust port 7B. The exhaust pipe 50 extends forward from the exhaust port 7B, then bends rightwards and sideways of the cylinder head 7 and further extends rearwards of the vehicle, with an exhaust muffler 51 being connected to the extending end of the exhaust pipe 50.

A fuel tank 56 is disposed above the cylinder head 7 and in front of the seat 57. Further, a fuel pump 81 for feeding fuel from the interior of the fuel tank 56 to the throttle body 8 is mounted below the fuel tank 56 and behind vertically central portions of the center frames 30.

Figure 2:
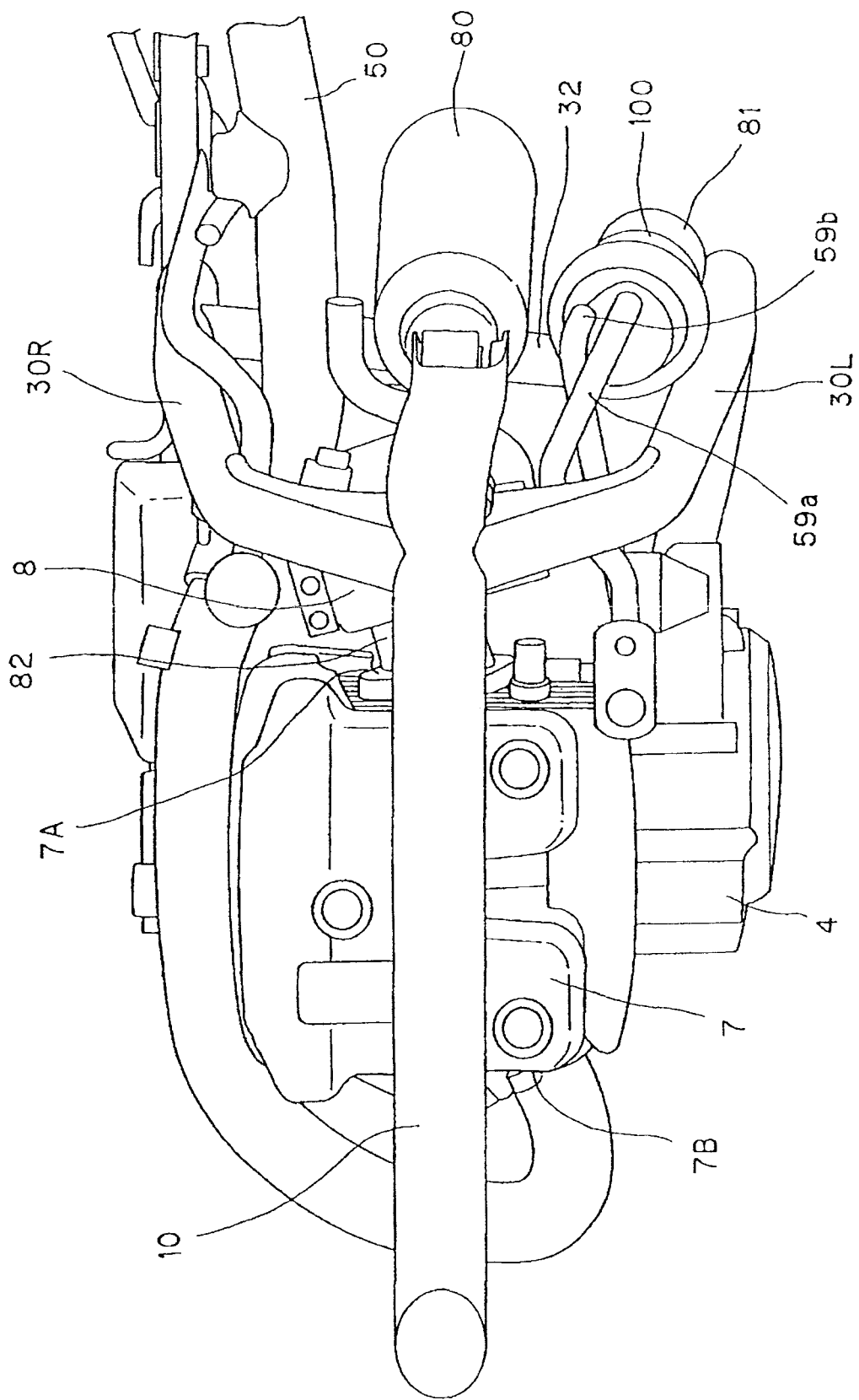
FIG. 2 is a partial plan view of the motorcycle of FIG. 1 as seen from above a vehicle body frame.

FIG. 2 is a plan view showing a top view of the fuel tank 56 as removed from the motorcycle of FIG. 1. FIG. 3 is a perspective view of FIG. 2 as seen from a front and obliquely right side and FIG. 4 is a perspective view of FIG. 2 as seen from a rear and obliquely right side. With reference to these figures, a description will be given below about the mounting position of the fuel pump 81.

As shown in FIG. 2, two center frames 30R and 30L extend in a right-left branched fashion from a rear portion of the main frame 10 which extends longitudinally through the transversely central part of the vehicle body. An upper end of the rear suspension damper 80 is secured to the rear end of the main frame 10. That is, the rear suspension damper 80 is disposed centrally of the vehicle body (see FIG. 2) and obliquely downwards in the longitudinal direction from its upper end to lower end portion (see FIGS. 1, 3 and 4).

The center frames 30R and 30L extend transversely from the rear portion of the main frame 10 and then extend downwards from near outer side portions of the vehicle body. The main frame 10 and the center frames 30L, 30R are columnar in shape.

On the right side of the main frame 10, as shown in FIG. 2, the exhaust pipe 50 (exhaust part) extended from the exhaust port 7B of the cylinder head 7 further extends longitudinally of the vehicle body. Moreover, as shown in FIG. 2, the throttle body 8 (intake part) is attached to an upper somewhat-near-the-center portion of the exhaust pipe 50 so as to extend backward and obliquely rightwards from the intake port 7A of the cylinder head 7 through a cone tube 82. The throttle body 8 is connected to a discharge port of the air cleaner box 9 (see FIG. 1) which is positioned on an extension line of the cone tube 82.

On the other hand, on the left side of the main frame 10, as shown in FIGS. 2 to 4, the fuel pump 81 is disposed between the rear suspension damper 80 and the left center frame 30L and behind and near the center frame 30L. As shown in FIG. 2, the fuel pump 81 is disposed at a rear position with respect to the pivot shaft 32 which extends in the vehicular transverse direction, and as shown in FIG. 4, it is secured to the center frame 30L through a bracket 100. As to the details of the mounting portion, a description will be given later.

As shown in FIGS. 1 and 3, a fuel pipe 59a extending toward the fuel tank 56 which is positioned higher than the fuel pump 81, as well as a breather tube 59b, are connected to an upper end of the fuel pump 81. The fuel pump 81 sucks in the fuel from the fuel tank 56 through the fuel pipe 59a.

Further, as shown in FIGS. 1 and 3, a fuel pipe 59c extending toward the throttle valve 8 positioned higher than the fuel pump 81 is connected to an upper portion of the fuel pump 81. Through the fuel pipe 59c the fuel pump 81 delivers the sucked-in fuel to the throttle valve 8.

The fuel tank 56, fuel pump 81 and throttle body 8 are arranged while ensuring a piping space so that their fuel supply line (length (distance) of the fuel pipes 59a, 59c and the breather tube 59b) is connected in this shortest distance. That is, the piping space is ensured so that the fuel supply line has a length falling under the range in which the fuel pump 81 can fully fulfill its function of sucking in fuel from the fuel tank 56 and feeding out the fuel.

Figure 5A:
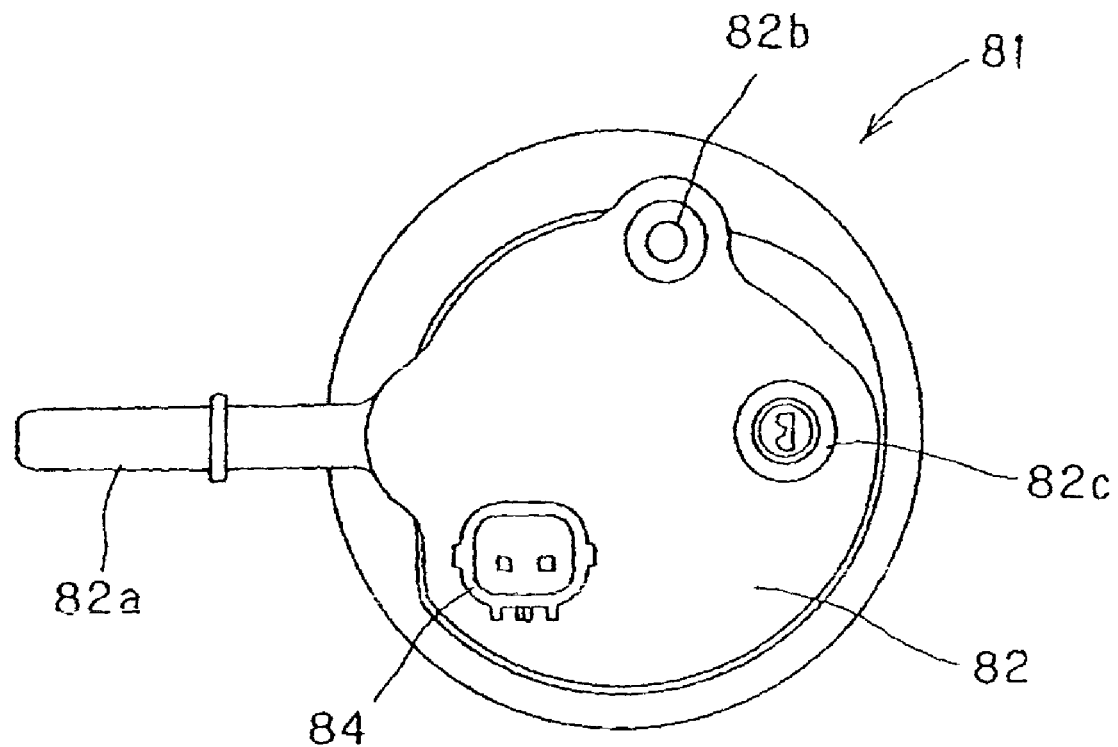
FIG. 5(a) is a plan view of a fuel pump alone and FIG. 5(b) is a front view thereof, partly in cross section.
Figure 5B:
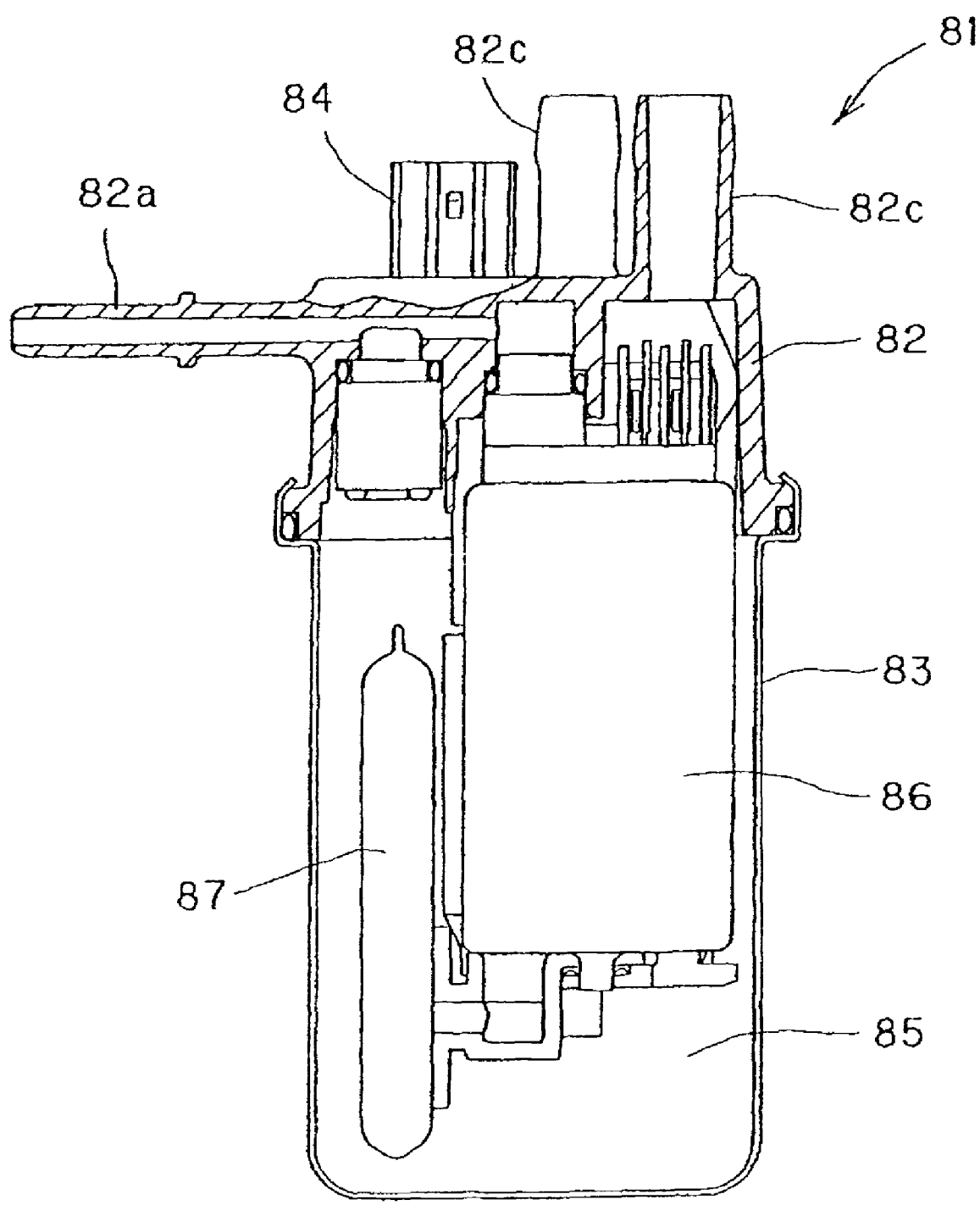

FIG. 5(*a*) is a plan view of the fuel pump 81 and FIG. 5(*b*) is a front view thereof, partly in section.

As shown in FIG. 5(*b*), the fuel pump 81 is made up of a cap portion 82 and a housing portion 83 secured by caulking to a lower outer periphery edge of the cap portion 82. As shown in FIGS. 5(*a*) and 5(*b*), the cap portion 82 is provided with a joint 82*a* projecting laterally and with the fuel pipe 59*c* attached thereto and joints 82*b* and 82*c* projecting upward and with both fuel pipe 59*a* and breather tube 59*b* attached thereto. A connector 84 for the supply of electric power to the fuel pump 81 projects upward on top of the cap portion 82. A combustion chamber 85 is formed by both cap portion 82 and housing portion 83. Further, a pump portion 86 and a filter mounted sideways of the pump portion 86 are accommodated within the combustion chamber 85.

According to this construction, the fuel stored within the combustion chamber 85 is sucked up by the pump portion 86 through the filter 87 and is fed to the throttle body 8 through the fuel pipe 59*c*. The fuel present within the fuel tank 56 is fed into the fuel tank 81 through the fuel pipe 59*a* by an amount corresponding to the amount of fuel fed out by the pump portion 86. That is, the fuel pump 81 also functions as an auxiliary fuel tank.

Figure 6A:
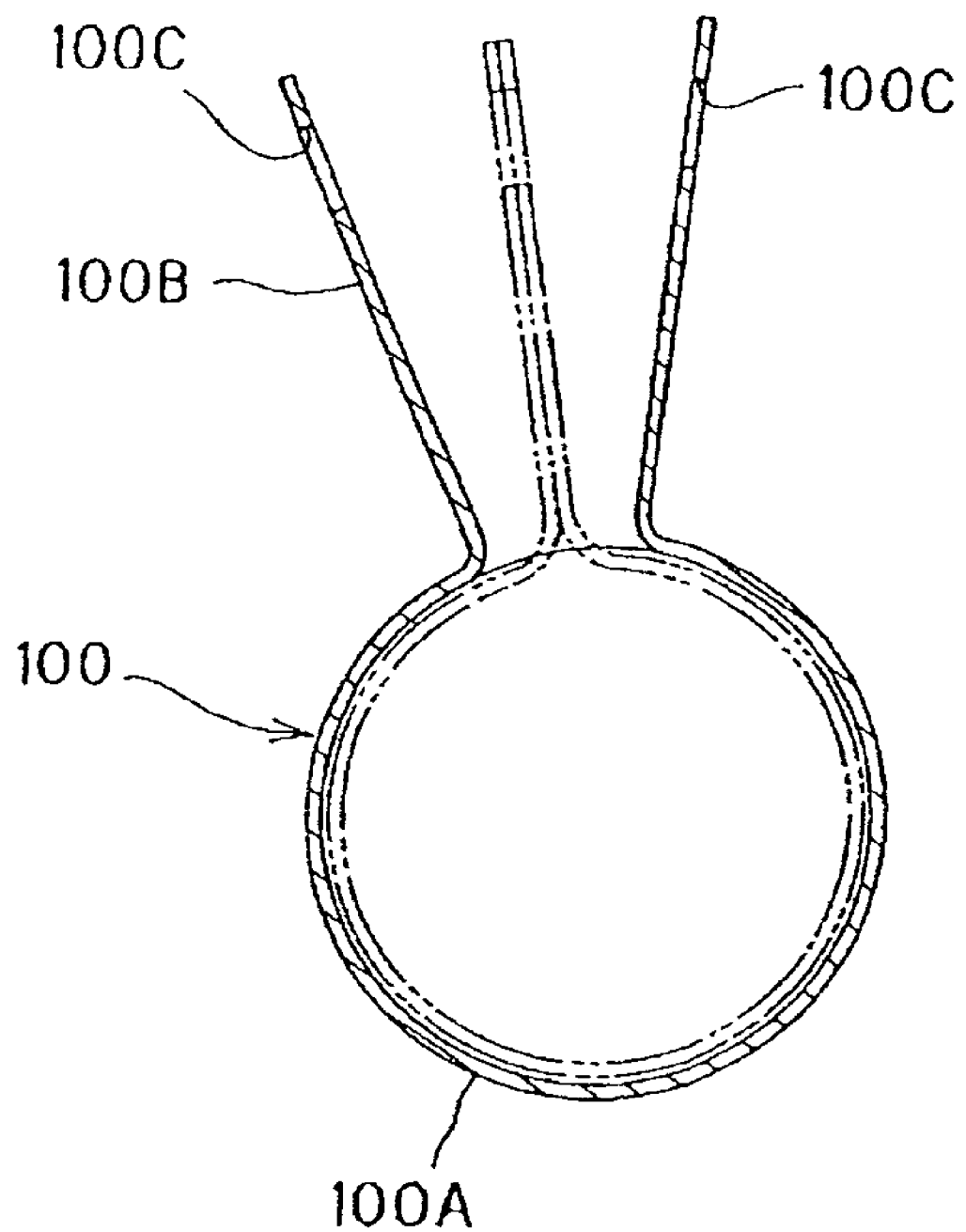
FIG. 6(a) is a cross sectional view of a fuel pump mounting bracket.
Figure 6B:
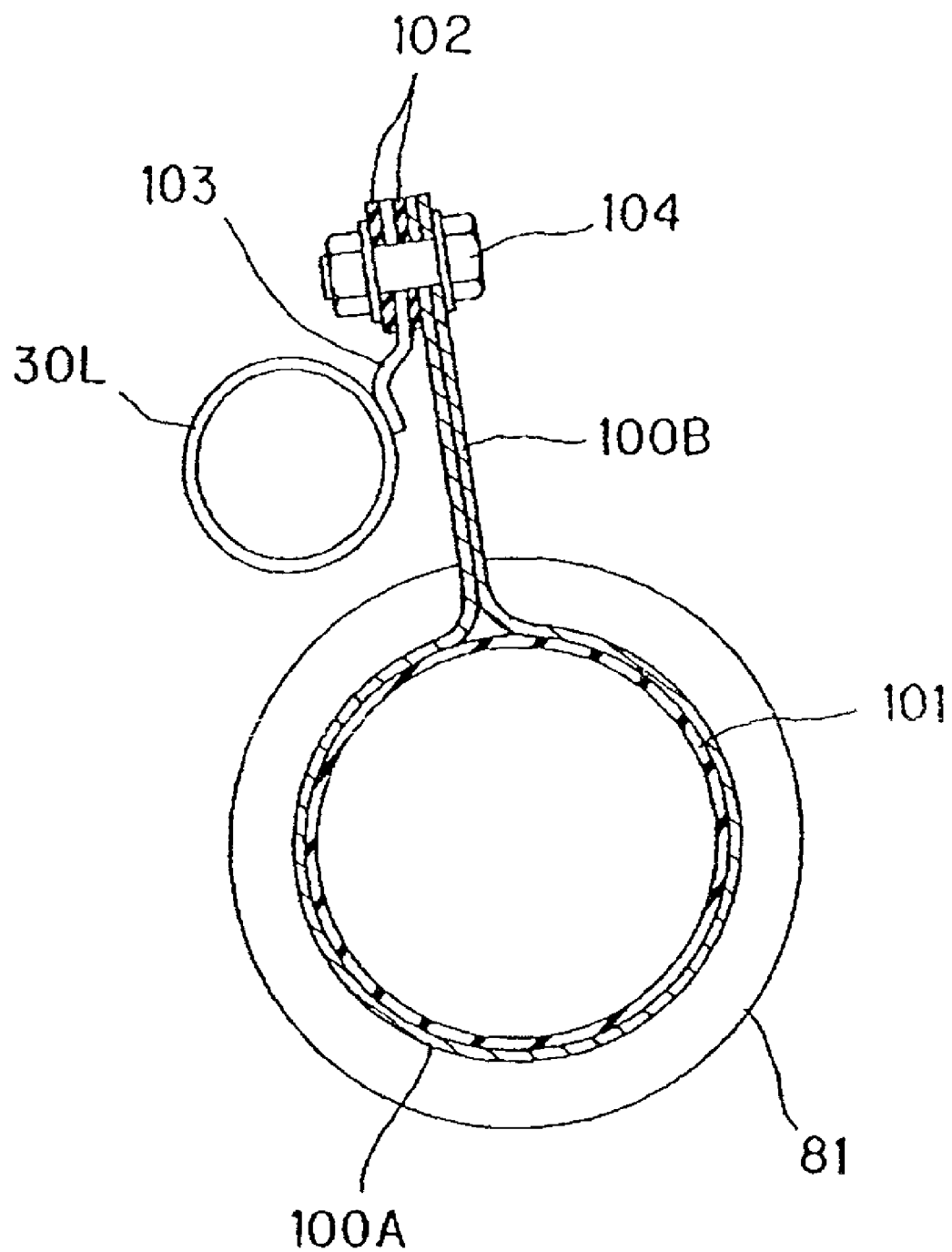
FIG. 6(b) is a cross sectional view taken on line 6-6 in FIG. 4, showing a fuel pump mounting portion.

FIG. 6(*a*) is a sectional view showing a bracket 100 for mounting the fuel pump. The bracket 100 is formed by bending a flat steel plate having elasticity and it includes an arcuate portion 100A mounted in a winding fashion around the body portion of the fuel pump 81 and two fixing portions 100B extending rectilinearly from ends of the arcuate portion. Further, mounting holes 100C are formed in front end portions respectively of the fixing portions 100B.

In the bracket 100 as a discrete part, as shown in FIG. 6(*a*), the two fixing portions 100B are spaced apart (opened) from each other in the circumferential direction of the arcuate portion 100A (indicated by a solid line in FIG. 6(*a*)). On the other hand, when mounting the fuel pump 81, the two mounting holes 100C are superimposed one on the other (indicated by a dash-double dot line in FIG. 6(*a*)) by utilizing the elasticity of the arcuate portion 100A, whereby the radial length of the arcuate portion 100A is contracted to hold the body portion of the fuel pump 81 grippingly.

FIG. 6(*b*) is a sectional view taken on line 6-6 in FIG. 4, showing a mounting portion of the fuel pump 81.

A rubber member 101 having elasticity is interposed between the arcuate portion 100A of the bracket 100 and the fuel pump 81. The rubber member 101 functions to prevent vibration from being propagated from the vehicle body side to the fuel pump 81 and its elastic modulus can be determined suitably on the basis of the model and displacement of the vehicle.

On the other hand, a metallic mounting piece 103 for mounting the bracket 100 is secured, for example, by welding to the center frame 30L. A mounting hole 103C is formed in a front end portion of the mounting piece 103. By aligning the mounting hole 100C of the bracket 100 with the mounting hole 103C and clamping the two together by means of a clamping member 104, the fuel pump 81 is fixed to the center hole 30L.

As shown in FIG. 6(*b*), sheet-like rubber members 102 are disposed between the metallic mounting piece 103 and the bracket 100 and also between the mounting piece 103 and the clamping member 104. The rubber members 102, like the rubber member 101, also function to prevent vibration from being propagated from the vehicle body side to the fuel pump 81 and their elastic modulus can be determined suitably on the basis of the model and displacement of the vehicle.

According to the fuel pump layout structure in a motorcycle according to this embodiment of the present invention, since the fuel pump 81 is disposed behind the center frame 30L and on the left side of the rear suspension damper 80, the influence of heat of the engine 4 on the fuel pump 81 can be kept to a minimum in comparison with the conventional fuel pump mounting position. Besides, since the distance between the engine 4 and the fuel pump 81 is not too far, the function of the fuel pump 81 to feed fuel to the throttle body 8 is not impaired. Further, since the mounting position of the fuel pump 81 is behind the center frame 30L, there is no fear of the fuel pump 81 projecting sideways of the vehicle body.

Moreover, since the throttle body 8 and the exhaust pipe 50 both connected to the engine 4 are disposed on the right side of the rear suspension damper 80, it is possible to ensure an optimum layout of the fuel pump 81, throttle body 8 and exhaust pipe 50 in the vicinity of the center frames 30R and 30L. Besides, since the piping space for connection between the fuel pump 81 and the fuel tank 56 and connection between the fuel pump 81 and the throttle body 8 is ensured in such a manner that the fuel supply line becomes short, the fuel pump 81 can fulfill its fuel sucking and delivering function to a satisfactory extent.

Further, since the fuel pump 81 is disposed in such a manner that the fuel tank 56 and the throttle body 8 are positioned higher than the fuel pump 81 and since the fuel pipe 59*a* for connection between the fuel pump 81 and the fuel tank 56, as well as the breather tube 59*b*, are connected to the upper end of the fuel pump 81, it is possible to shorten the distance (fuel supply line) between the fuel tank 56 and the fuel pump 81 and hence possible to shorten the piping. Besides, since the fuel pipe 59*c* for connection between the fuel pump 81 and the throttle body 8 is connected to the upper portion of the fuel pump 81, it is possible to shorten the distance (fuel supply line) between the fuel pump 81 and the throttle body 8 and hence possible to shorten the piping. Consequently, the fuel pump 81 can fulfill its fuel sucking and delivering function to a satisfactory extent.

On the other hand, since the fuel pump 81 is mounted to the center frame 30L through the bracket 100 and the rubber members 101 and 102 are interposed between the bracket 100 and the fuel pump 81 and between the bracket 100 and the center frame 30L, vibration on the vehicle body side can be absorbed by the rubber members 101 and 102. As a result, vibration is no longer propagated to the fuel pump 81 and it is possible to improve the operational reliability of the fuel pump 81.

Moreover, by disposing the fuel pump 81 outside the fuel tank 56, it is possible to effect storage of a larger amount of fuel. Further, since fuel can be stored also within the fuel tank 81 as an auxiliary tank, a still larger amount of fuel can be stored.

Although the best mode for carrying out the present invention has been described above, the present invention is not limited to the above embodiment, but various modifications and changes may be made on the basis of the technical idea of the present invention.

Although in the above embodiment the fuel pump 81 is disposed on the left side of the rear suspension damper 80 and intake/exhaust parts are disposed on the right side of the rear suspension damper 80, a modification may be made so that the fuel pump and the intake/exhaust parts may be disposed on the opposite sides. Also with this structure, the influence of heat of the engine 4 on the fuel pump 81 can be minimized and it is possible to ensure an optimum layout of the fuel pump 81, throttle body 8 and exhaust pipe 50 in the vicinity of the center frames 30R and 30L.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A fuel pump layout structure in a motorcycle, comprising:
    an engine;
    a fuel pump for the supplying fuel to the engine;
    a frame for supporting the engine and the fuel pump, said frame including a main frame extending backward and obliquely downward longitudinally through a transversely central part of the motorcycle, and center frames extending in a right-left branched fashion from a rear portion of the main frame; and
    a rear suspension damper disposed centrally between the center frames, with an upper end supported by the rear portion of the main frame and extending obliquely downward from the upper end to a lower end,
    wherein said fuel pump is disposed on one side of said damper, between the damper and one of the center frames, behind the center frames, and above a swing arm of the motorcycle, and
    wherein an intake part and an exhaust part, both connected to said engine, are disposed on an other side of said damper, with respect to said fuel pump.

2. The fuel pump layout structure in a motorcycle according to claim 1, wherein said fuel pump is attached to said frame through a bracket and a rubber member is interposed between said bracket and said fuel pump and also between said bracket and said frame.

3. The fuel pump layout structure in a motorcycle according to claim 1, wherein said fuel pump is disposed substantially parallel with said damper.

4. The fuel pump layout structure in a motorcycle according to claim 1, wherein said fuel pump is mounted below a fuel tank of the motorcycle.

5. The fuel pump layout structure in a motorcycle according to claim 4, wherein said fuel pump is disposed below both the fuel tank and a throttle body of the motorcycle, wherein fuel pipes connect to an upper portion of said fuel pump.

6. The fuel pump layout structure in a motorcycle according to claim 1, wherein said fuel pump is disposed between said damper and one of the center frames extending in the left branched fashion.

7. The fuel pump layout structure in a motorcycle according to claim 1, wherein said fuel pump is disposed between said damper and one of the center frames extending in the right branched fashion.

8. A fuel pump layout structure in a motorcycle, comprising:
    an engine;
    a fuel pump for the supplying fuel to the engine;
    a frame for supporting the engine and the fuel pump, said frame including a main frame extending backward and obliquely downward longitudinally through a transversely central part of the motorcycle, and center frames extending in a right-left branched fashion from a rear portion of the main frame; and
    a rear suspension damper disposed centrally between the center frames, with an upper end supported by the rear portion of the main frame and extending obliquely downward from the upper end to a lower end,
    wherein said fuel pump is disposed on one side of said damper, between the damper and one of the center frames, behind the center frames, and above a swing arm of the motorcycle,
    wherein an intake part and an exhaust part, both connected to said engine, are disposed on an other side of said damper, with respect to said fuel pump, and
    wherein said fuel pump is mounted below a fuel tank of the motorcycle and behind.

9. The fuel pump layout structure in a motorcycle according to claim 8, wherein said fuel pump is disposed below both the fuel tank and a throttle body of the motorcycle, wherein fuel pipes connect to an upper portion of said fuel pump.

10. The fuel pump layout structure in a motorcycle according to claim 8, wherein said fuel pump is disposed between said damper and one of the center frames extending in the left branched fashion.

11. The fuel pump layout structure in a motorcycle according to claim 8, wherein said fuel pump is disposed between said damper and one of the center frames extending in the right branched fashion.

* * * * *